Patented Aug. 12, 1924.

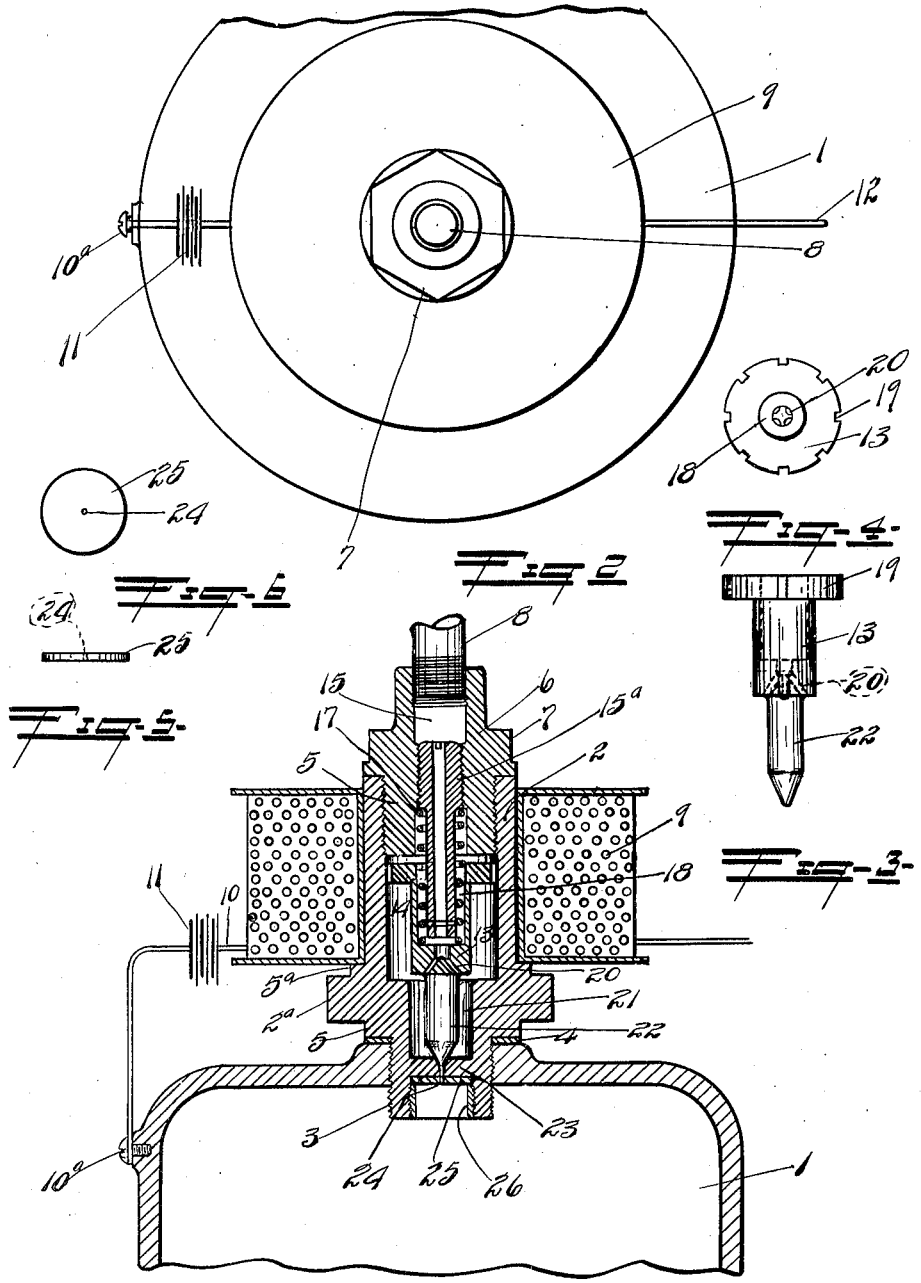

1,504,773

UNITED STATES PATENT OFFICE.

SHELDON MARSTON, OF BAY CITY, MICHIGAN.

ELECTROMAGNETIC VALVE.

Application filed March 31, 1922. Serial No. 548,556.

*To all whom it may concern:*

Be it known that I, SHELDON MARSTON, a citizen of the United States of America, and a resident of Bay City, in the county of Bay and State of Michigan, have invented certain new and useful Improvements in Electromagnetic Valves, of which the following is a specification.

This invention relates to valves and the like, and particularly to valves which are located in conduits for controlling the flow of fluid, gas, or air therein.

One object of the invention is to design a valve of simple and durable construction, and provide means whereby the said valve may be vibrated to open and close a passage or port through which the gas, air, or fluid may flow.

A further object of the invention is to provide means for limiting the valve opening to control the volume of gas, air, or fluid passing through the valve.

A still further object is to design a valve by means of which an even distribution of fuel may be obtained and whereby the jet or nozzle may be changed to vary the discharge opening, this is particularly advantageous where the valve is used on internal combustion engines, where gasoline is used as a fuel which is fed to the engine under pressure.

With the above and other objects in view the present invention consists in the combination and arrangement of parts hereinafter more fully described, illustrated in the accompanying drawings, and particularly pointed out in the appended claims, it being understood that changes may be made in the size, proportion and minor details of construction, without departing from the spirit or sacrificing any of the advantages of the invention.

In the drawings:—

Fig. 1 is a sectional side view of my improved valve structure illustrating it applied to the cylinder of an internal combustion engine.

Fig. 2 is a top plan view thereof.

Fig. 3 is a detail of the armature and valve.

Fig. 4 is a top plan view thereof.

Fig. 5 is an edge view of the removable disk.

Fig. 6 is a top plan view thereof.

Referring now particularly to the drawing in which I have shown the preferred embodiment of my invention, the numeral 1 indicates a fragmentary portion of the cylinder of an internal combustion engine, and while in the present instance I am illustrating the structure as applied thereto, I wish it clearly understood that it can be used for any other purpose and anywhere where it is desired to periodically interrupt and permit the flow of liquid, air, or gas of any kind.

The structure comprises a cylindrical barrel or casing 2 formed of a suitable non-conductive material, the lower end 3 of which is reduced and exteriorly threaded and is adapted to have threaded engagement with an opening provided in the head of the cylinder, a gasket 4 being interposed between the cylinder head and the shoulder 5 of the casing to provide a tight joint thereat. The casing 2 is formed with an enlarged hexagon shaped portion $2^a$ with shoulders 5 and $5^a$ on either side thereof, the one end being reduced and threaded as stated. The upper end of this casing is open and is interiorly threaded to receive the threaded portion 5 of the plug 6, this plug is shouldered and is hexagon shaped as shown at 7 to facilitate its removal and insertion in the casing 2. A suitable pipe 8 is threaded into the top of this plug and leads to a pressure tank (not shown) for supplying fuel or other liquid to the cylinders.

A magnet coil 9 surrounds the casing 2, one terminal 10 of the coil being connected to a battery 11 by means of which the coil is energized, the other terminal 12 is connected to the timing mechanism (not shown) and by means of which the electric current is periodically interrupted in the usual manner to properly vibrate the armature 13 which is seated in the chamber 14 formed in the casing, the battery being in turn grounded to the cylinder wall at the point $10^a$. A passage 15 is provided in this plug 6 and communicates with the chamber 14 in the casing 2, said passage way being reduced as shown at $15^a$ and is threaded to receive the adjusting plug 16 which is formed with a slot in its head adapted to receive a tool for adjusting the plug vertically in the passage and limit the movement thereof, the lower end of this passage way 15 is enlarged to accommodate a coiled spring member 17 which surrounds the adjusting plug 16 and is interposed between the threaded enlarged portion of the adjusting plug and the armature, said adjusting plug having a continuous passage therethrough to allow for the passage of the fuel. The valve is formed integral with the armature 13 as clearly shown in Figures 3 and 4 of the drawing, and the armature is formed with a socket or recess 18 into which the plug 16 extends, this recess also serves as a seat for and confines the spring 17. The enlarged upper end of the armature is adapted to slidably fit the chamber 14, and this large surface distributes and equalizes the pressure of fuel thereon, a plurality of vertically extending slots 19 being formed in spaced relation in the edge thereof to prevent it from sticking to the walls of the chamber and also to allow for the passage of fuel, said enlarged portion being of a thickness sufficient to maintain it in upright position at all times, a plurality of radially extending openings or passages 20 are further provided in the armature for conveying the fuel from the socket 18 into the chamber.

The chamber 14 opens into a smaller chamber 21 into which the valve stem 22 extends, the valve proper being tapered as shown and is normally seated in a valve seat provided in the wall 23, a removable disk 25 is held against the underside of the wall 23 by means of a nipple 26 as shown, and a discharge opening 24 is provided therein, the discharge opening is very minute so that when the fuel is forced therethrough it will act as a jet or nozzle to spray the fuel into the combustion chamber of the engine and when it is desired to vary the volume of fuel admitted to the cylinder, it is merely necessary to change the disk as the discharge openings are of different sizes, also, should this valve seat wear and thereby increase or prolong the valve opening this disk can be quickly and easily replaced.

It will therefore be obvious that this valve is capable of two distinct and separate adjustments, viz, by means of the adjusting plug 16 which can be screwed down to limit the lift of the valve, and by changing the disks to vary the size of the discharge opening, the first mentioned adjusting feature is especially desirable in connection with single cylinder engines, and when used on multiple cylinder engines these valves can all be set by first using a gage and then setting each adjusting plug accordingly, further, this adjusting plug 16 can be so constructed that it can be turned and adjusted from the outside, making it unnecessary to remove the pipe 8 when desiring to adjust, this would means the addition of a stuffing box to prevent leaks, in this construction the head of the plug would be hexagon shaped and the pipe would have threaded engagement with the plug proper, the structure can also be formed with a flange which can be bolted to the cylinder head instead of being threaded into the head as shown, these are however merely structural differences, the operation being substantially identical, it is also common knowledge that the pulling power of the magnet will be considerably increased by providing an iron shell for the magnet coil.

In actual practise the fuel is forced through the pipe 8 under pressure, flowing through the adjusting plug 16 and into the chambers 14 and 21, the valve being seated and held in place by the spring and the fuel pressure on the armature which prevents the fuel flowing into the cylinder, but when the magnet coil is energized through instrumentality of the timing device, the armature and valve is lifted and the fuel is discharged through the opening in the disk, the current is then interrupted and the valve is forced to its seat by the spring 17, the valve opening is of course governed by the position of the adjusting screw 16 and it will be noted that the top of the armature is at all times spaced from the plug 6 and no sediment is formed on the top thereof.

From the foregoing description it will be obvious that I have perfected a very simple and practical electromagnetic valve which can be used for controlling the flow of air, gas and liquids.

What I claim is:—

1. An electromagnetic valve comprising a core having a chamber formed therein, a plug having threaded engagement with the chamber, a magnet coil surrounding said core, an armature, and a valve stem formed integral therewith, a socket in said armature, an adjustable plug threaded into said first mentioned plug member and extending into the said socket, a fuel passage through the adjustable plug, a disk removably secured in the core and a fuel discharge opening in the disk.

2. An electromagnetic valve comprising a casing having chambers formed therein, a magnet coil surrounding said casing, a plug having threaded engagement therewith, a passage through said plug and a hollow adjustable stem having threaded engagement therein, an armature slidably mounted in the chamber and provided with a socket into which the adjustable stem projects, a valve formed integral with the armature, a valve seat in the casing, and a disk removably secured beneath the said seat, and means normally tending to force the valve to its seat.

3. An electromagnetic valve comprising a hollow casing, a plug having threaded engagement therewith, an armature slidably mounted in the casing and having a valve stem formed integral therewith, a socket in said armature and a hollow adjustable stem mounted in the said plug and projecting into said socket, a magnet coil surrounding said opening, a disk having a discharge orifice therein, and means for normally forcing the valve stem to its seat for closing said orifice.

4. An electromagnetic valve comprising a hollow casing and a plug having threaded engagement with the upper end thereof, a magnet coil surrounding the casing, an armature loosely mounted therein, and having a valve stem formed integral therewith, a valve seat in the casing, a disk removably secured thereto, and provided with a discharge opening therein, means for seating the valve to close said opening, and adjustable means for limiting the raise of the valve and armature.

5. An electromagnetic valve comprising a hollow casing and a hollow plug having threaded engagement therewith, an armature slidably mounted in the casing and provided with a plurality of fluted openings around the outer periphery thereof, a valve stem formed integral with the armature and movable therewith, a removable disk in the casing, a discharge opening therein, and a magnet coil surrounding the casing and adapted to vibrate the armature for opening said valve, and means for forcing the valve to its seat.

6. An electromagnetic valve comprising a hollow casing, and a hollow plug having threaded engagement therewith, an armature slidably mounted in the casing and provided with a plurality of fluted openings around the outer periphery thereof, a valve formed integral with the armature and movable therewith, a valve seat in the casing, a removable disk having a discharge opening therein, and a magnet coil surrounding the casing and adapted to vibrate the armature to open the valve when the coil is energized.

7. An electromagnetic valve comprising a hollow casing and a hollow plug secured thereto, a hollow stem adjustably mounted therein, an armature slidably mounted in the casing and provided with a plurality of fluted openings around the outer periphery thereof, a valve formed integral with the armature, a socket in the armature into which the hollow stem extends, and passages from the socket to the chamber, a disk removably mounted in the casing and provided with a discharge orifice therein adapted to be closed by said valve, and a magnet coil surrounding the said casing and adapted to vibrate said armature to open the valve when the coil is energized.

In testimony whereof I affix my signature.

SHELDON MARSTON.